United States Patent [19]

Laperle

[11] Patent Number: 4,928,457
[45] Date of Patent: May 29, 1990

[54] WEED CUTTER

[76] Inventor: Guy Laperle, 27 Clifton Street, Sawyerville, Canada, J0B 3A0

[21] Appl. No.: 174,907

[22] Filed: Mar. 29, 1988

[51] Int. Cl.⁵ ............................................ A01D 34/67
[52] U.S. Cl. .................................. 56/12.7; 56/320.1; 30/276
[58] Field of Search ..................... 56/12.7, 320.1, 295; 30/276, 347

[56] References Cited

U.S. PATENT DOCUMENTS

| | | | |
|---|---|---|---|
| 4,091,536 | 5/1978 | Bartholomew | 30/276 |
| 4,412,382 | 11/1983 | White | 56/12.7 |
| 4,426,780 | 1/1984 | Foster | 56/12.7 |
| 4,428,183 | 1/1984 | Lowry et al. | 56/320.1 |
| 4,630,371 | 12/1916 | Graham | 56/12.7 |
| 4,707,919 | 11/1987 | Tsuchiya | 56/12.7 |

Primary Examiner—John Weiss

[57] ABSTRACT

The weed cutter is of the rotary type in which a filament supply is wound on a spool located in a cylindrical housing driven in rotation and from which issues an adjusted filament length, which is held taut by centrifugal force and cuts the weed, while rotating. A skirt is fixed to the support and overlies the inner portion of the rotating filament. The skirt has an oval shape to enable safe cutting action of the cutter while being swung in both directions by the operator. Another device includes a stationary cutter blade mounted at the junction area. The cutter blade could be fixed within the skirt. The skirt is also applicable to a weed cutter in which the filament is replaced by cutting blades.

13 Claims, 2 Drawing Sheets

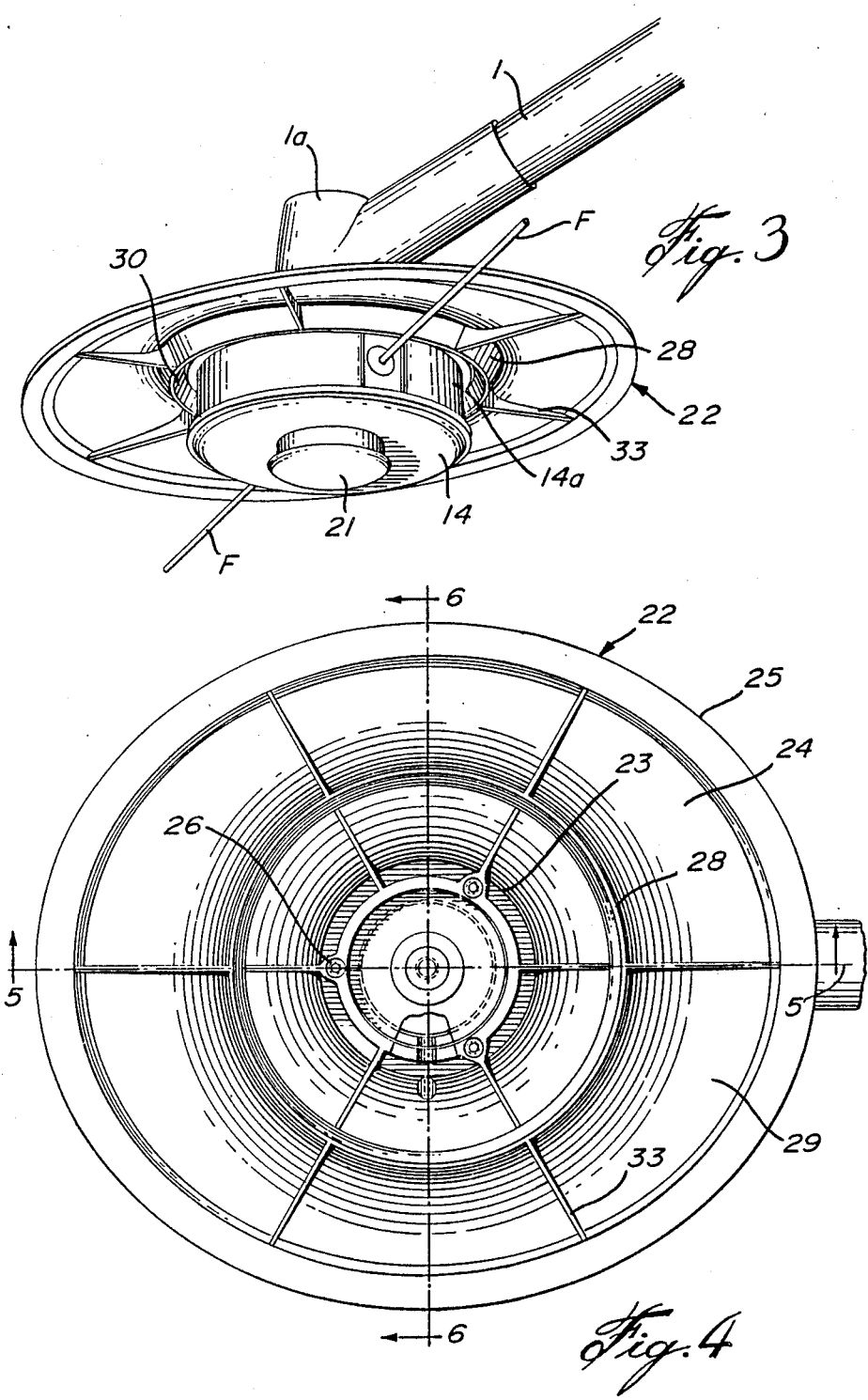

WEED CUTTER

FIELD OF THE INVENTION

The present invention relates to weed cutters and, more particularly, to weed cutters of the rotary type and provided with a long handle adapted to be swung left and right by an operator.

BACKGROUND OF THE INVENTION

Known weed cutters of the present type include a non-rotating shaft support, a shaft journalled in said support and projecting therefrom, and a rotary cutting assembly secured to said shaft. The cutting element of the assembly in accordance with one class of weed cutters consists of a flexible filament, and in accordance with another class of steel or plastic blades of various shapes.

It has been found that a major disadvantage of conventional weed cutters of the above types, and especially of the type in which a flexible filament or light implement is used as the cutting element, resides in that such weed cutters, when swung from left to right, tend to move out of the weeds towards the operator. This tendency frequently occurs when the rotating assembly slows down due to wound weeds, as explained above. This can cause accidents. As a matter of fact, manufacturers of such conventional weed cutters clearly indicate in their instructions not to effect cutting during the left-to-right swinging movement of the cutter. Obviously, this more or less doubles the time required to cut weeds on a surface of a given area.

OBJECTS OF THE INVENTION

The general object of the present invention is to provide a weed cutter which will obviate the above-noted disadvantages of conventional weed cutters.

Another object of the present invention is to provide for the rotary cutters using a filament or blade as a cutting member, a skirt or guard, of such shape as to enable the operator to effect weed cutting while swinging the cutter in both swinging directions, namely during left-to-right swinging as well as during right-to-left swinging.

SUMMARY OF THE INVENTION

There is disclosed a weed cutter of the rotary hand-held type in which a motor-driven shaft is journalled in a shaft support and projects outwardly therefrom, there being a cutting assembly carried by said shaft.

In accordance with the invention, there is provided a skirt which depends from said shaft support and which has a spiral or oval shape that permits safe cutting while swinging the cutter in either direction.

BRIEF DESCRIPTION OF THE DRAWINGS

FIG. 3 is a bottom perspective view of a second embodiment of the skirt of the invention; and FIG. 4 is a bottom plan view of the second embodiment of the skirt;

DETAILED DESCRIPTION OF THE PREFERRED EMBODIMENTS

Figure 1:
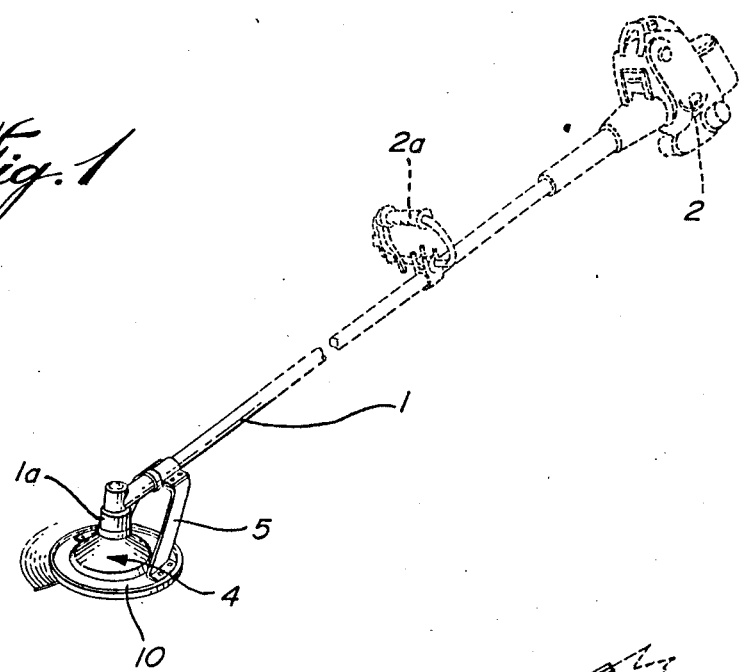
FIG. 1 is a perspective view of a first embodiment of the weed cutter of the invention showing part of the handle and the driving engine in dotted line.
Figure 2:
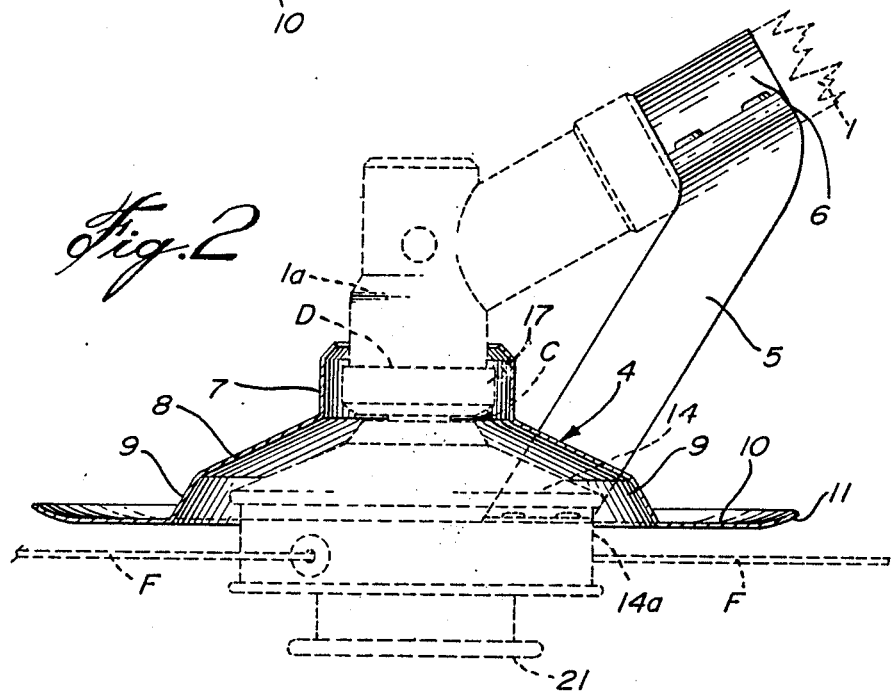
FIG. 2 is a cross-section of the skirt and a side elevation of its holding bracket in accordance with the first embodiment, the conventional part of the weed cutter being shown in dotted line.

The present invention is used in association with a weed cutter of the type shown in FIGS. 1, 2 and 3 wherein there is shown an elongated tubular handle 1, which generally, outwardly extends from, and is secured to, a shaft support 1a, making an obtuse angle therewith. The outer end of handle member 1 carries an internal combustion engine, generally indicated at 2, the driven shaft of which extends through the hollow handle 1 and conventionally provided with a bevelled gear within the top part of the support 1a in meshing engagement with another bevelled gear fixed to the drive shaft 12 secured to a cylindrical housing, generally indicated at 14, in which is located a supply of a flexible filament wound in a coil on a spool, not shown, with the filament indicated at F, issuing from a hole made in a cylindrical surface 14a of housing 14.

The filament can be wound on the spool, such that two lengths of filament will issue from diametrically-opposite sides of the housing 14, as shown in the drawings.

The housing 14 has an internal mechanism to allow release of an adjustable length of filament F by means of a pull-button 21 and then retaining the spool in its rotated position to prevent further exit of the filament. This is of known construction and need not be detailed.

The weed cutter handle 1 is normally held over an operator's shoulder and retained by the hand-grip 2a and possibly also by a harness, and is swung left and right in a more or less arcuate path to cut weed, such as hay, bush or other plants. The filament F, of an adjusted length, rotates at high speed under the action of the engine 2 and is therefore made taut under centrifugal force.

A skirt, generally indicated at 4, (see FIGS. 1 and 2) is retained in, fixed position by means of a bracket 5, forming a half-collar about its upper end, this half-collar being completed by a second half-collar 6 to form a full collar for surrounding handle 1 and be fixed thereto.

The skirt 4 defines a cylindrical upper portion 7, spacedly surrounding the washer 17 and extended in turn by a downwardly-flaring frusto-conical portion 8, starting about the level of joint C and conforming to the upper frusto-conical surface of the housing 14 but spaced therefrom.

Frusto-conical portion 8 is in turn downwardly extended by a second frusto-conical portion 9, of a steeper angle, and the latter is extended by a radial, flat portion 10 with a slightly-upwardly inclined marginal portion 11. Flat portion 10 is aligned with the upper part of the cylindrical wall 14a of housing 14 and spaced above the filaments F.

FIGS. 3 and 4 show a preferred embodiment of the skirt. Skirt 22 is preferably made of synthetic resin, reinforced with fibers, such as glass-fibers. Skirt 22 in the embodiment shown has an oval shape, as seen in FIG. 4, with the major axis of the oval lying in a plane extending through shaft 12 and containing the longitudinal axis of handle 1. The purpose of the oval shape of the skirt will be explained hereinafter.

The skirt 22 has a central portion or core 23 which merges with an outer marginal portion 24 terminated by a peripheral edge 25. The skirt 22 is rigidly secured to shaft support 1a by means of bolts 26, for instance three equally, angularly spaced bolts 26, as shown in FIG. 4.

A lip 28, of circular shape when seen in bottom plan view, is integrally formed with the skirt 22 and protrudes downwardly from its underface down to approximately the level of the underface 29 at the edge 25. This lip 28 defines a radially inner surface 30 plurality of radial ribs 33 extend radially outwardly therefrom and merge with the under surface 29 near the edge 25.

The reason the skirt 22 is of oval shape is as follows. The resultant force exerted on a weed cutter with or without a circular skirt tends to move the cutter out of the weed being cut towards the operator when the cutter is swung from left to right, the filament rotating counterclockwise. This is not safe. The oval shape permits a variable length of filament F to be exposed on the outside of the skirt during each half-turn. Thus, the loading of cut weed on the rotating filament is modified during each half-turn. This permits the filament, when it enters the weed, to be exposed to a decreasing force from a point when the filament is at substantially right angle to the handle 1 until it ceases cutting. The above-noted resultant force is therefore sufficiently decreased to permit safe cutting in both swinging directions.

The theoretical shape of the skirt would be a pair of spiral skirt edges, each starting from a minimum radial distance from the shaft axis and progressively increasing in radial distance through substantially 180 degrees, both in the direction of cutting implement rotation. However, this forms a shoulder at each of the two junctions of the two spirals, and this is not practical. This notch or shoulder must be rounded, hence the oval shape. With this arrangement, it has been found that the weed cutter can be safety swung by the operator in both directions.

In theory, the major axis of the double-spiral or oval shape should always be perpendicular to the instantaneous displacement of the skirt and, therefore; its orientation should continuously vary during the swinging movement, because the skirt does not describe a true circular arc when cutting.

In practice, this major axis lies in the plane of the handle. However, the orientation of the major axis in a horizontal plane can vary, depending on the type of the weed cutter.

What I claimed is:

1. A vegetation cutting device of the rotary type comprising a drive shaft, a support for said drive shaft, a cutting assembly rotatably connected to said drive shaft, said cutting assembly including a cutting element to cut vegetation when rotating in a cutting plane substantially normal to the axis of said drive shaft, a skirt fixed to said support and overlying said cutting assembly, said skirt having a peripheral edge lying in a plane generally parallel to said cutting plane, said cutting element having a radially outer portion protruding radially outwardly from said peripheral edge of said skirt when rotating, the peripheral edge of said skirt defining a first zone at a minimum radial distance from said drive shaft axis and a second zone at a maximum radial distance from said drive shaft axis, the radial distance of said edge from said drive shaft axis progressively increasing from said first zone to said second zone in the rotation direction of said cutting assembly.

2. A vegetation cutting device as defined in claim 1, wherein said zones lie on an axis which is perpendicular to the displacement direction of said cutting assembly when cutting.

3. A vegetation cutting device as defined in claim 1, wherein the peripheral edge of said skirt defines two radially-opposite first zones and two radially-opposite second zones.

4. A vegetation cutting device as defined in claim 3, wherein said second zones lie on an axis which is perpendicular to the displacement direction of said cutting assembly when cutting.

5. A vegetation cutting device as defined in claim 3, wherein an elongated handle member is fixed to said support, said second zones lying substantially in the plane containing said drive shaft axis and said elongated handle member.

6. A vegetation cutting device as defined in claim 3, wherein an elongated handle member is fixed to said support, said second zones lying on an axis which, at the most, makes a small angle with the plane containing said drive shaft axis and said elongated handle member.

7. A vegetation cutting device as defined in claim 3, wherein said first zones are substantially equally radially distant and said two second zones are substantially equally radially distant.

8. A vegetation cutting device as defined in claim 7, wherein said second zones lie on an axis which is perpendicular to the displacement direction of the said cutting assembly when cutting.

9. A vegetation cutting device as defined in claim 7, wherein an elongated handle member is fixed to said support, said second zones lying substantially in the plane containing said drive shaft axis and said elongated handle member.

10. A vegetation cutting device as defined in claim 7, wherein an elongated handle member is fixed to said support, said second zones lying on an axis which, at the most, makes a small angle with the plane containing said drive shaft axis and said elongated handle member.

11. A vegetation cutting device as defined in claim 3, wherein said skirt has a generally oval shaped peripheral edge.

12. A vegetation cutting device as defined in claim 11, wherein an elongated handle member is fixed to said support, the major axis of said oval-shaped peripheral edge being substantially in the plane containing said drive shaft axis and said elongated handle member.

13. A vegetation cutting device as defined in claim 11, wherein an elongated handle member is fixed to said support, the major axis of said oval-shaped peripheral edge lying on an axis which, at the most, makes a small angle with the plane containing said drive shaft axis and said elongated handle member.

* * * * *

UNITED STATES PATENT AND TRADEMARK OFFICE
CERTIFICATE OF CORRECTION

PATENT NO. : 4,928,457
DATED : May 29, 1990
INVENTOR(S) : Guy Laperie It is certified that error appears in the above-identified patent and that said Letters Patent is hereby corrected as shown below:

ON THE TITLE PAGE:  In the abstract, lines 9,10,11, delete --Another device includes a stationary cutter blade mounted at the junction area. The cutter plate could be fixed within the skirt.--

Column 3 line 5, after "inner surface 30" insert --To reinforce lip 28, a--.

Column 3 line 44, the word "claimed" should be --claim--.

Signed and Sealed this

Twenty-second Day of October, 1991

Attest:

HARRY F. MANBECK, JR.

*Attesting Officer*   *Commissioner of Patents and Trademarks*